US007925273B2

(12) United States Patent
Fomukong et al.

(10) Patent No.: US 7,925,273 B2
(45) Date of Patent: Apr. 12, 2011

(54) METHOD AND APPARATUS FOR UPDATING THE LOCATION OF A MOBILE DEVICE WITHIN A WIRELESS COMMUNICATION NETWORK

(75) Inventors: Mundi Fomukong, Los Angeles, CA (US); Denzil Willoughby Chesney, Los Angeles, CA (US)

(73) Assignee: Enovsys LLC, Beverly Hills, CA (US)

(*) Notice: Subject to any disclaimer, the term of this patent is extended or adjusted under 35 U.S.C. 154(b) by 672 days.

(21) Appl. No.: 11/933,296

(22) Filed: Oct. 31, 2007

(65) Prior Publication Data
US 2008/0051105 A1 Feb. 28, 2008

Related U.S. Application Data

(60) Division of application No. 10/414,348, filed on Apr. 15, 2003, which is a continuation of application No. 09/265,236, filed on Mar. 8, 1999, now Pat. No. 6,560,461, which is a continuation-in-part of application No. 08/905,674, filed on Aug. 4, 1997, now Pat. No. 5,918,159.

(51) Int. Cl.
*H04W 24/00* (2009.01)
(52) U.S. Cl. .................. 455/456.1; 455/432.1; 455/436; 455/445; 455/450; 455/457
(58) Field of Classification Search ............... 455/404.2, 455/456.1–456.3
See application file for complete search history.

(56) References Cited

U.S. PATENT DOCUMENTS

| 5,552,795 A | * | 9/1996 | Tayloe et al. | 342/357.16 |
| 5,731,785 A | * | 3/1998 | Lemelson et al. | 342/357.07 |
| 5,943,621 A | * | 8/1999 | Ho et al. | 455/456.3 |

* cited by examiner

*Primary Examiner* — Dai A Phuong

(57) ABSTRACT

A location reporting paging communication system comprising space satellites, ground stations and a remote receiving unit adapted to resolve a global position from signals transmitted from a communication transmitter. The subscriber in possession of the remote receiving unit updates the paging network with global positioning information. A caller paging a subscriber in possession of the remote receiving unit may request the global location of the remote receiving unit. The paging network could divulge or block such information from a caller depending on the requirements of the subscriber.

2 Claims, 4 Drawing Sheets

METHOD AND APPARATUS FOR UPDATING THE LOCATION OF A MOBILE DEVICE WITHIN A WIRELESS COMMUNICATION NETWORK

CROSS-REFERENCE TO RELATED APPLICATIONS

This application is a divisional of U.S. application Ser. No. 10/414,348, filed Apr. 15, 2003, which is also a continuation of U.S. application Ser. No. 09/265,236 filed Mar. 8, 1999 issued as U.S. Pat. No. 6,560,461, which in turn is a continuation-in-part of U.S. application Ser. No. 08/905,674, filed Aug. 4, 1997 issued as U.S. Pat. No. 5,918,159. This application is related to PCT Application US 98/19270. These related applications are incorporated herein by reference.

BACKGROUND OF THE INVENTION

The field of the invention is telecommunication services and systems, specifically such services and systems that have the ability to locate a remote unit using a telecommunication network.

Today, portable mobile telecommunication devices such as cellular telephones, pagers and other handheld information receiving devices are utilized by a greater cross section of the population since they are relatively inexpensive to acquire. Normally information from a communication source is transmitted to a subscriber in possession of a handheld communication information receiving device at a remote global location. The caller or source of information dials a number and a communication channel is set up for communication with a remote receiving unit such as a handheld communication device. Currently there is no infrastructure in place whereby a caller may request the location of the remote receiving unit from the network. The caller or communication source cannot determine where a message is sent.

SUMMARY OF THE INVENTION

The present invention is directed to a communication system using a network of signal transmitting and receiving units and remote receiving units. Information about the location of the remote receiving units is employed by the system.

In a first separate aspect of the present invention, a network of signal transmitting and receiving units and at least one positioning transmitter for transmitting positioning information communicate with a remote receiving unit. The remote receiving unit is capable of selectively providing secured and accessible remote receiving unit position information to the network of signal transmitting and receiving units.

In a second separate aspect of the present invention, the foregoing aspect further includes a terrestrial control station and terrestrial signal transmitting and receiving stations and/or satellite signal transmitting and receiving stations.

In a third separate aspect of the present invention, a network of signal transmitting and receiving units includes means for determining that the location of a remote receiving unit is requested. A means for locating the signal transmitting and receiving unit in the network which is able to communicate with the remote receiving unit is employed with a means for reporting the location of that unit.

In a fourth separate aspect of the present invention, the positioning information of a remote receiving unit is provided to a network of signal transmitting and receiving units with the information selectively secured by the remote receiving unit from inquiry to the network. The remote receiving unit may be capable of communication with at least one positioning transmitter and capable of two way communication with the network of signal transmitting and receiving units to disclose a global location to the network. The network may include satellite units and terrestrial units.

In a fifth separate aspect of the present invention, a method for divulging or blocking the location of a remote receiving unit associated with a network is contemplated. The method includes receiving authorization at the network to block or divulge the location from the remote receiving unit, receiving a request at the network for the location of a remote receiving unit, identifying the source of the request if required, transmitting the request and the identification of the source of the request by the network to the remote receiving unit for authorization and responding to the request according to the authorization. A sensory signal may be transmitted from the remote receiving unit until transmitting the positional information is successfully completed.

In a sixth separate aspect of the present invention, a method for updating a network of signal transmitting and receiving units about the positional information for a remote receiving unit includes providing positional information about the remote receiving unit to the remote receiving unit, comparing the positional information with pre-selected active areas stored in the remote receiving unit and generating a sensory signal at the remote receiving unit if the comparison is negative. The network may be updated with the positional information of the remote receiving unit.

In a seventh separate aspect of the present invention a method for transmitting a message to a remote receiving unit by a network of signal transmitting and receiving units includes configuring the message to include the addresses of at least selected signal transmitting and receiving units of the network and transmitting the message to a series of signal transmitting and receiving units of the network in series. The units with a selected address beams the message to the corresponding coverage areas. The message is then reconfigured to eliminate the address of the receiving signal transmitting and receiving unit before it is re-transmitted to a subsequent signal transmitting and receiving unit.

In an eighth separate aspect of the present invention, any of the foregoing aspects are contemplated to be combined.

Thus, it is an object of the present invention to provide an improved communication network. Other and further objects and advantages will appear hereafter.

DETAILED DESCRIPTION OF THE PREFERRED EMBODIMENT

Figure 1:
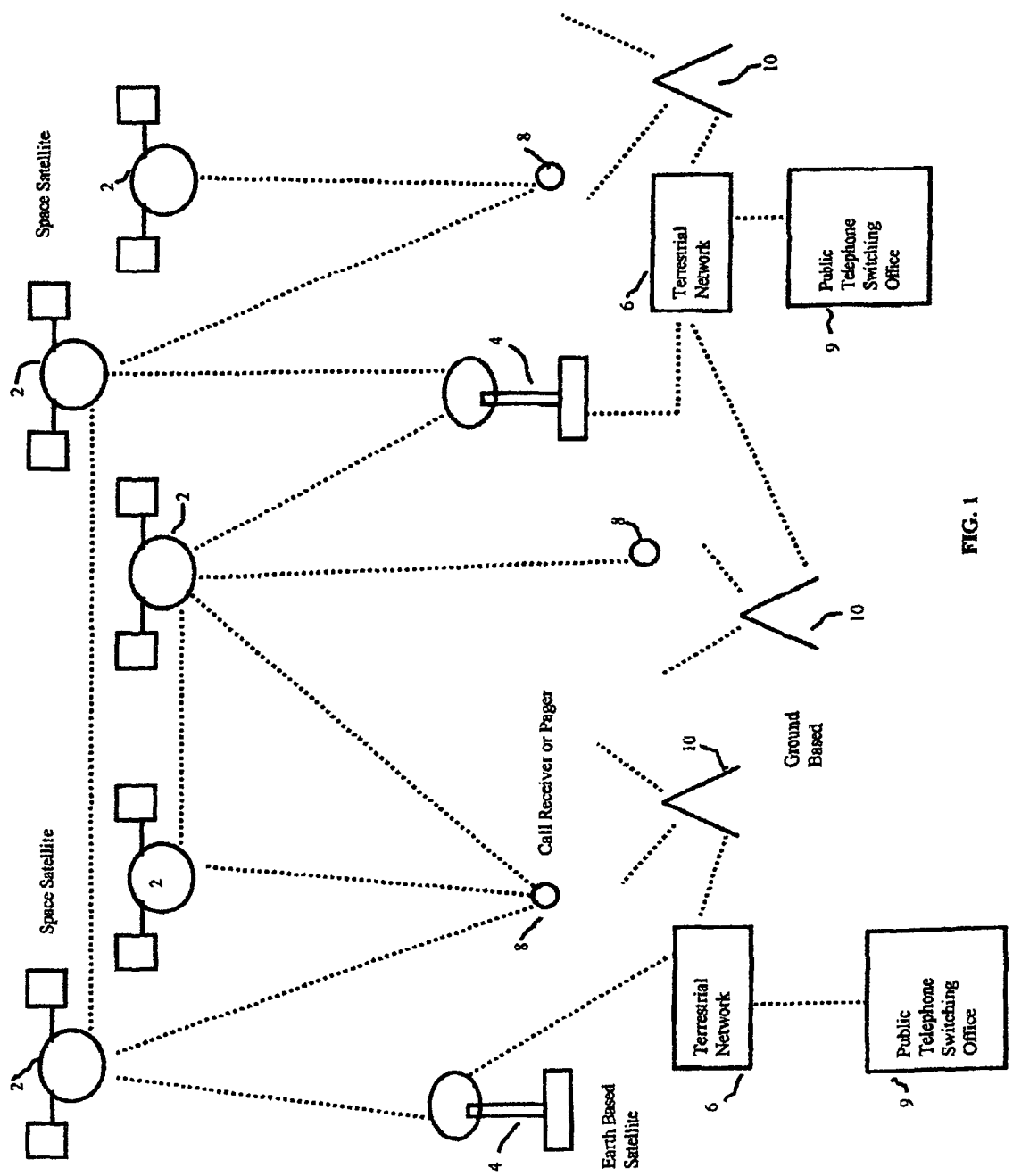
FIG. 1 shows a global satellite paging network.

The present system will consist of satellites [2] in space, communicating with earth based stations [4] and the remote receiving unit [8] which may variously be referred to as a call receiver or pager. Ground based transmitters [10] will be employed to transmit pages to the remote receiving unit [8].

Terrestrial network control stations [6], will be employed to effectively control the activities of the entire global paging network. The system will be developed such that a remote receiving unit operating under an existing paging systems will work. Thus, a network of signal transmitting and receiving unit is developed.

Upon subscribing to a paging network a subscriber selects global areas (pre-selected paging areas) where they wish to receive paging messages. The pre-selected areas, pager ID, paging protocol and other relevant information of the remote receiving unit are stored in the data library of a paging control station [6] for all pagers utilizing the paging network. The remote receiving unit [8], will periodically resolve a global position from signals transmitted from satellites and earth based communication means. The resolved global position will be periodically utilized to update the network each time a user is out of their paging area or each time the paging network requests a remote receiving unit to disclose their global position. This will enable the paging network to know the exact global location of a remote receiving unit whenever the need arises. Messages received for a remote receiving unit are processed by the network and transmitted to the global or active area of the remote receiving unit.

To initiate a page, a caller or communication source may use any regular communication device such as a telephone, personal computer to access the paging network. The caller may add specific codes to a paging message to enable the paging network to disclose the global position of the remote receiving unit after the message is transmitted. The caller's message is firstly processed by the local telephone switching office [9] before transmission to the paging control station [6]. The paging control station [6] will be employed to control all the activities of the network. Upon receiving a paging message, a paging control station decodes the message for relevant information such as pager ID and determines if a caller requires the global position of the pager. Other relevant information such as the paging protocol of the remote receiving unit, pre-selected or preferred worldwide areas to receive pages and the current active area of the remote receiving unit are retrieved from the paging control station's data library. The paging control station [6] validates the current active area of the remote receiving unit with the pre-selected areas to receive pages. If the current active area of the remote receiving unit is valid and within a pre-defined time interval the message is transmitted to the remote receiving unit. If the current active area is invalid (remote receiving unit is out of pre-selected paging area) the message is not transmitted to the remote receiving unit and the caller is notified. In instances where the current active area of the remote receiving unit is valid but the remote receiving unit has not updated the network with its current position over a pre-defined time period, the paging control station will encode the message such that a request will be placed for the remote receiving unit to update its current active global position. As each subscriber of the paging network can only travel a limited distance by air, land or sea within a pre-defined time interval, the paging network, based upon when a remote receiving unit last updated their global location will select appropriate earth based stations and space satellites to transmit the message to the remote receiving unit at specified worldwide locations. The remote receiving unit upon receiving this signal will disclose their global location.

As a user travels from city to city or country to country, the remote receiving unit will periodically resolve a global position from signals transmitted from satellites and earth based communication means. This information will be utilized by the remote receiving unit or user in possession of the remote receiving unit to update the current active area held by the paging network for that remote receiving unit. Also, the remote receiving unit will store this information in its memory such that future resolved global positions could be validated against this information to ensure that the active area currently held and utilized by the paging network to transmit pages to the remote receiving unit is not outdated.

Once a control station determines where a message will be sent, the control station determines the best possible way to transmit the message. With a knowledge of the geographical distribution of all earth based satellite transmitters [4], ground base transmitter stations [10] and space satellites [2], the paging control station [6] will encode a message such that the sequence of transmission of the message will be included. The ID of all the ground stations or space satellites that will be employed in the message transmission chain will be encoded in a chronological order and the message will be routed to the first ground station. This station could be an earth station that transmits directly to satellite [4], or a ground based transmitter [10]. For example, after a paging control station encodes a message and determines which stations (earth or satellite) should transmit the message, the message is routed to the first earth station. The first earth station could either transmit the message directly to satellite or beam the message to their coverage area. Subsequent stations that receive the message decode the message and determine if other stations are required to transmit the message. If other stations are required to transmit the message the current station re-encodes the message so as to eliminate itself from the message transmission chain before retransmitting the message to the next station. By re-encoding the message an earth station or satellite station will prevent subsequent stations involved in the message transmission chain to retransmit the message back to that station. If an earth station or satellite determines it is required to broadcast a message, the message is beamed to the area covered by that station. The transmission chain continues until the last station broadcasts the message and acknowledges with a status signal which is sent back to the paging control station. Upon receiving this signal, the ground control station can alert the caller that the message was successfully sent. Therefore, with a knowledge of the geographical distribution of the paging network's earth and satellite transmitters, and a knowledge of the current active area of a remote receiving unit, a ground control paging station could effectively encode a caller's message to include all satellite and earth based stations that will be employed in the message transmission chain. This will eventually minimize the risk of a satellite or earth based transmitter from being overloaded.

Once a paging control station [6] receives a message from a caller, the control station, determines if the caller requested the global position of the remote receiving unit. The control station then verifies from its data library if the positioning disclosure feature for that remote receiving unit has not been blocked by the subscriber. Each remote receiving unit will have a special code whereby if identified in a caller's paging information, will allow the paging control station to disclose the remote receiving unit global position. If such a code is not detected in a callers message and the caller requested the global location of a remote receiving unit, the caller will be immediately notified that their request was not authorized by the subscriber using the remote receiving unit. A subscriber may change their positioning disclosure code at anytime and reveal such information only to individuals who could acquire information regarding their global whereabouts from the paging network. The paging network will only override the users request and disclose a subscribers global position only in an emergency circumstance. Also the network operation could be such that a network might disclose all locations whenever a call is placed to a subscriber and subscribers may opt not to have their location disclosed.

Figure 3:
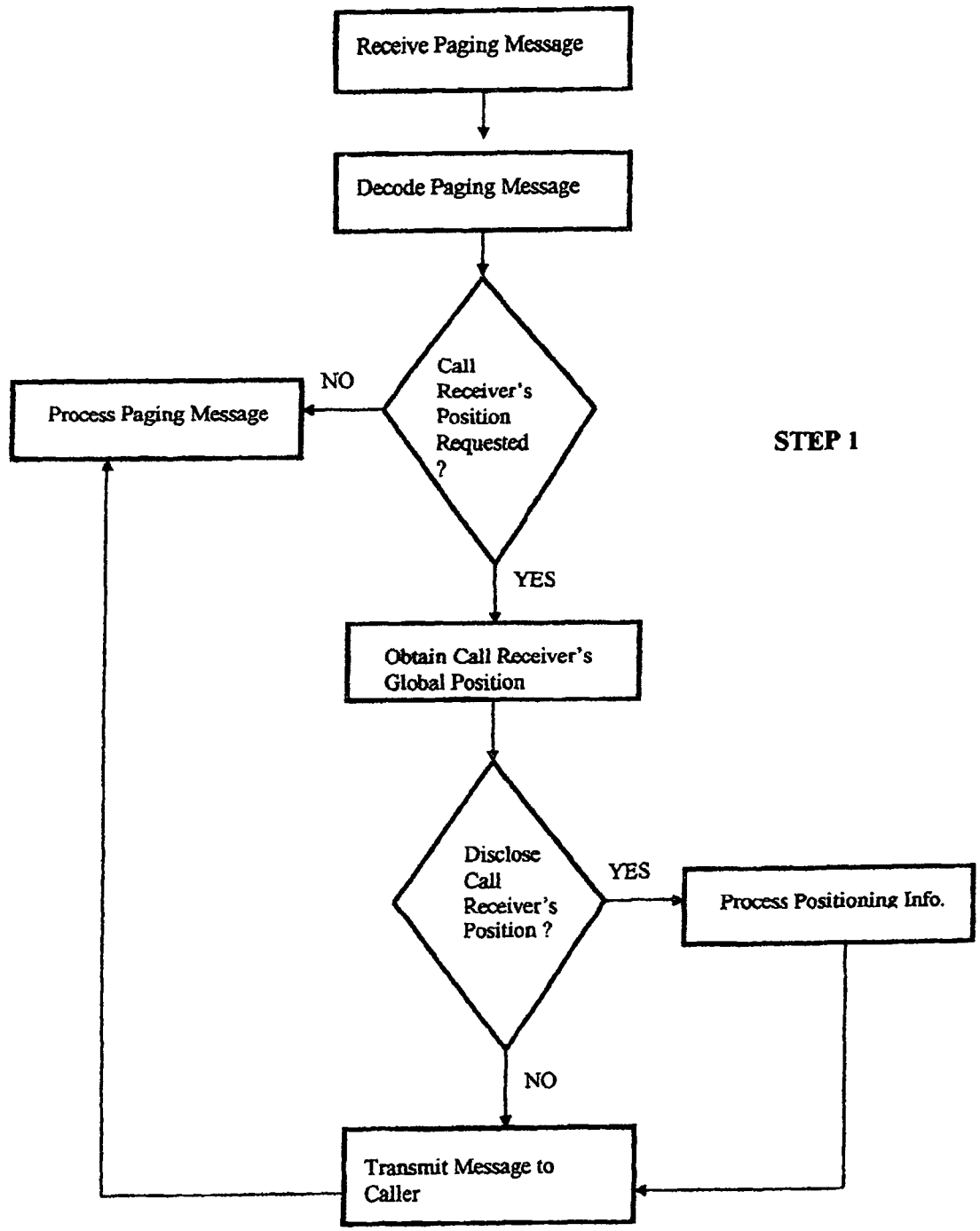
FIG. 3 shows a flow chart illustrating the operation of a paging network control station each time a caller request for the global position of a remote receiving unit.

If the positioning disclosure feature is blocked for any call, a message is sent to the caller indicating that the subscriber does not wish their current global position disclosed. If the positioning disclosure feature is active, the control station retrieves the coordinates of the remote receiving unit global position and encodes that information before transmission to the caller. Such information may describe the latitude and longitude of the subscriber including a more simplified information such as the country, city or town were the message was sent. The steps carried out by the control station during this process are best illustrated in step 1, FIG. 3. In this illustration, the paging control station upon receiving a paging message decodes the message and checks if the message includes a request for the remote receiving unit global position. If such information is not required the message is processed normally. If the remote receiving unit global position is required and the positioning disclosure code is detected, the remote receiving unit positioning information is retrieved from the data bank of the paging control station. If the information retrieved from the paging control station's databank is unavailable or out of date, a request could be made that the remote receiving unit disclose its current position. If the control station establishes that the positioning disclosure feature is blocked for that message, the caller is immediately notified with the appropriate message. If the remote receiving unit positioning disclosure feature for the message in process is active, the positioning information of the remote receiving unit is processed and transmitted to the caller and the caller's message is processed for dispatch to the remote receiving unit as previously disclosed.

A communication source may request the unit to disclose its position to one or more communication targets. Upon receiving this signal the caller may be alerted and location information of the unit may be selectively or fully relayed to the respective communication targets. In instances where a communication source does not have direct access to obtain a subscriber's location from the communication network, the source may poll for the location of a remote unit by including specific information which when received by the remote receiving unit will reveal the identity of the source and a request for the location of the remote unit. The remote unit may either accept or decline to this request by transmitting specific information back to the paging network which will reveal or block the location to the caller.

In another scenario a remote unit may disclose location information to a communication target such as a remote computer or terminal via the network. In this situation a user selects or specifies the destination ID of the communication target, which may be a computer or terminal address. The location of the remote unit is resolved and transmitted to the communication target via the network with the appropriate information if available. In a distress situation a subscriber may use this feature to alert the network with location and relevant distress information which when received by the network could enable the dispatch of an emergency team to that location. Other service industries may utilize the network to allow for certain types of information that are location dependent disclosed to their site. For instance a caller driving on a highway and in full view of an accident may simply disclose that information through the input panel and the appropriate authority could be notified of such an event happening at that location. In a rainy, foggy or highly congested traffic area a subscriber in possession of this unit may relay such an event to the appropriate authority. Furthermore, subscribers may use this feature at any time to log their locations at their home computer or any relevant Internet site by selecting or specifying the appropriate ID or address for location information dispatch.

For positioning, the remote receiving unit will be preprogrammed to periodically resolve a position from signals transmitted from satellites and earth based communication means. At least the remote receiving unit should have the means to provide the paging network with positioning information. Some of the satellites and earth based transmitters used to transmit paging information could be employed to transmit referenced positioning signals to the remote receiving unit. Alternatively the Global Positioning System well known in the art as GPS could also be utilized by the remote receiving unit to resolve a global position. However the remote receiving unit should have a means to resolve a global position from L-band signals transmitted from at least one satellite, depending on the resolving technique employed. GPS is currently being used to provide worldwide positioning information to mobile users around the globe. Such positioning information has an accuracy of about one hundred meters and could further be improved to an accuracy of five meters if referenced signals from ground based transmitters are utilized in the resolving process. A fully operational Global Positioning System includes up to 24 satellites dispersed around six circular orbits. The dispersion and inclination of the satellites is such that at least three or more satellites are readily visible from most parts on the earth surface. In a typical example, for a remote receiving unit to resolve a global position, the remote receiving unit need to solve for two variables of position, latitude and longitude. The satellites, equipped with atomic clocks act as a beacon and transmit signals that tell the remote receiving unit where it is and what time the signal was sent. From this information, a remote receiving unit can determine how far it is from the satellite by comparing the time sent with the time received and multiplying by the speed of light (distance=velocity*time). Since there is a bias between the GPS time and the user's time, a third variable time will be required. Having three satellites in view at any point in time, a remote receiving unit will be able to solve for latitude, longitude and time. For three dimensional positioning a fourth variable and satellite will be required. Upon resolving a global position the remote receiving unit could update the network with its present global location or the remote receiving unit could alert a user when they are out of their active or preselected global areas to receive pages.

Figure 2:
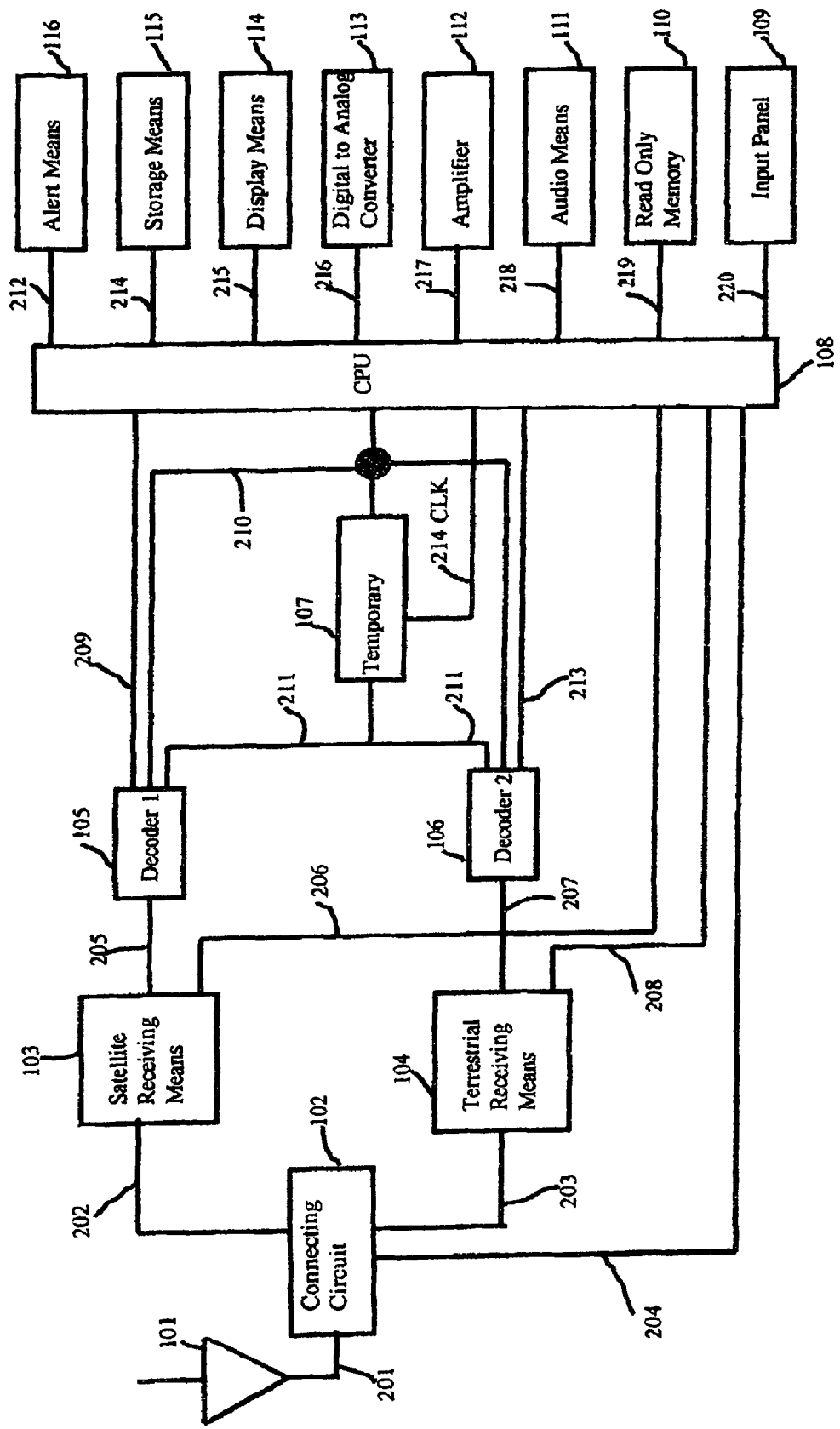
FIG. 2 shows a block diagram of the remote receiving unit, or pager.

The remote receiving unit (FIG. 2) will receive messages transmitted from satellites and terrestrial based transmitters through the transceiver [101]. The connecting circuitry [102] of the remote receiving unit, controlled by the CPU [108], will route satellite based signals via 202 to the satellite receiving means [103] and terrestrial based signals via 203 to the terrestrial receiving means [104]. The connecting circuitry may include a filter arrangement and a switch that will allow L-band or satellite frequencies to pass via 202 and terrestrial or Ultra High Frequencies to pass via 203. This signals could either be paging message signals or global positioning signals. Therefore depending on the pre-loaded protocols and initialization data, the CPU will drive the connecting circuitry [102], satellite receiving means [103], terrestrial receiving means [104] to scan and process specific frequencies.

Satellite signals are processed by the satellite receiving means [103]. This unit will process global positioning satellite signals and satellite message signals. The satellite receiving unit will include satellite signal amplifiers, mixers and filters that will convert the L band global positioning and message signals received from the connecting circuit [102] to an appropriate level for efficient processing by the decoding circuit [105]. The satellite receiving means circuitry is well known by any one well skilled in the art. The operation of this unit is controlled by the microprocessor or CPU [108] via 206.

The CPU determines the appropriate intermediate frequencies and output signals that will be generated by the satellite receiving unit [103]. This is based on the initialization parameters pre-loaded in the ROM [110] of the remote receiving unit. The CPU controls the satellite receiving unit via 206, and the output signals produced by the satellite receiving unit [103] are routed via 205 to the decoder [105] for intelligence extraction and error correction. Decoder [105] is controlled by the CPU [108] via 209. Transmission of data directly by Decoder [105] or Decoder [106] to the CPU input port via 210 is determined by the CPU. If the CPU determines satellite messages are of high priority Decoder [105] is signaled via 209 to transmit data directly to the CPU via 210 and Decoder [106] is signaled via 213 to temporary hold its data. Decoder [106] will store its data in the Temporary Store [107] via 211 for later retrieval by the CPU. If terrestrial based signals are of a higher priority Decoder [105] is signaled to temporary hold its data. Again each decoder could be equipped with a store eliminating the use of the Temporary Store [107]. If a decoder is not equipped with storage means, the decoder could download its data via 211 to the temporary data storage while the other decoder will transmit directly to the CPU via 210. If multiple decoders are required to decode multiple satellite and earth based signals (message and positioning signals), the CPU could again determine when each decoder should transmit it's data to the CPU's input port, with each decoder equipped with the appropriate storage means to temporarily hold it's data until such transmit instruction is received from the CPU.

Terrestrial based signals will be processed by the terrestrial receiving means [104]. This UHF or VHF signals will be routed by the connecting circuitry [102] via 203 to the terrestrial receiver [104]. Again, the terrestrial receiving unit will include Ultra High Frequency (UHF) or Very High Frequency (VHF) amplifiers, filters and down converting circuitry to process the signal from 203 to an appropriate level for efficient processing by decoder [106]. Direct transmission of data from decoder 2 [106] to the CPU via 210 will be controlled by the CPU. The operation of this part of the receiver will be similar to the satellite receiving end. Therefore, the CPU [108] will control the operation of the connecting circuitry, the satellite and terrestrial receiving means. The CPU [108] will have the ability to determine exactly when a satellite or terrestrial message or positioning signal is received and processed.

Once the CPU completes processing data from a decoder [106,107], the CPU retrieves data from the temporary data storage [107] for processing. As previously stated multiple decoders could be employed. In this situation each decoder will have the ability to store or hold its data temporarily or use the temporary storage [107] until signaled by the CPU to transmit data directly via 210. Relevant communication links will be added to interface the newly added decoders to the CPU [108], satellite receiving unit [103], and the terrestrial receiving unit [104]. With this technique all message and positioning signals transmitted from either satellite or earth based communication means will be eventually decoded and processed by the CPU, with rarely any message being lost or corrupted in this process.

To conserve receiver power, the CPU could be preprogrammed so as to control the connecting circuitry [102], the satellite receiving module [103], and the terrestrial receiving module [104], to process positioning signals periodically. in this situation only paging messages (voice and alphanumeric) will be allowed to pass, while positioning information signals will be periodically blocked. If a paging message received requires the remote receiving unit to disclose its current global location, the CPU [108] upon detecting this request will allow the remote receiving unit to resolve a global position from satellite and earth based referenced signals before resuming operation normally.

If a decoded message received by the CPU via 210 is voice or alphanumeric, the CPU alerts the user either through the display [114], alert means [116] or audio means [111] as to the presence of a new message. Alphanumeric messages are displayed through the display while voice messages are routed to the digital to analog (D/A) converter [113], so that they are converted to their analog format by the D/A converter. The analog signal is amplified by the amplifier [112], and the amplified signal is used to drive the audio means [111] (speaker or earphone). The memory means [115] is used to store messages for future replay by the user. These messages are first compressed by the CPU before storage in memory. Prior to replay or redisplay the messages are decompressed.

Once a user subscribes to the global paging network, the remote receiving unit is initialized. Relevant data such as the paging protocols, frequencies, preferred paging locations and other relevant data are down loaded into the ROM [110] of the remote receiving unit. As the user travels from one global location to another, this information will be used by the CPU to control the actions of all modules of the remote receiving unit.

Figure 4:
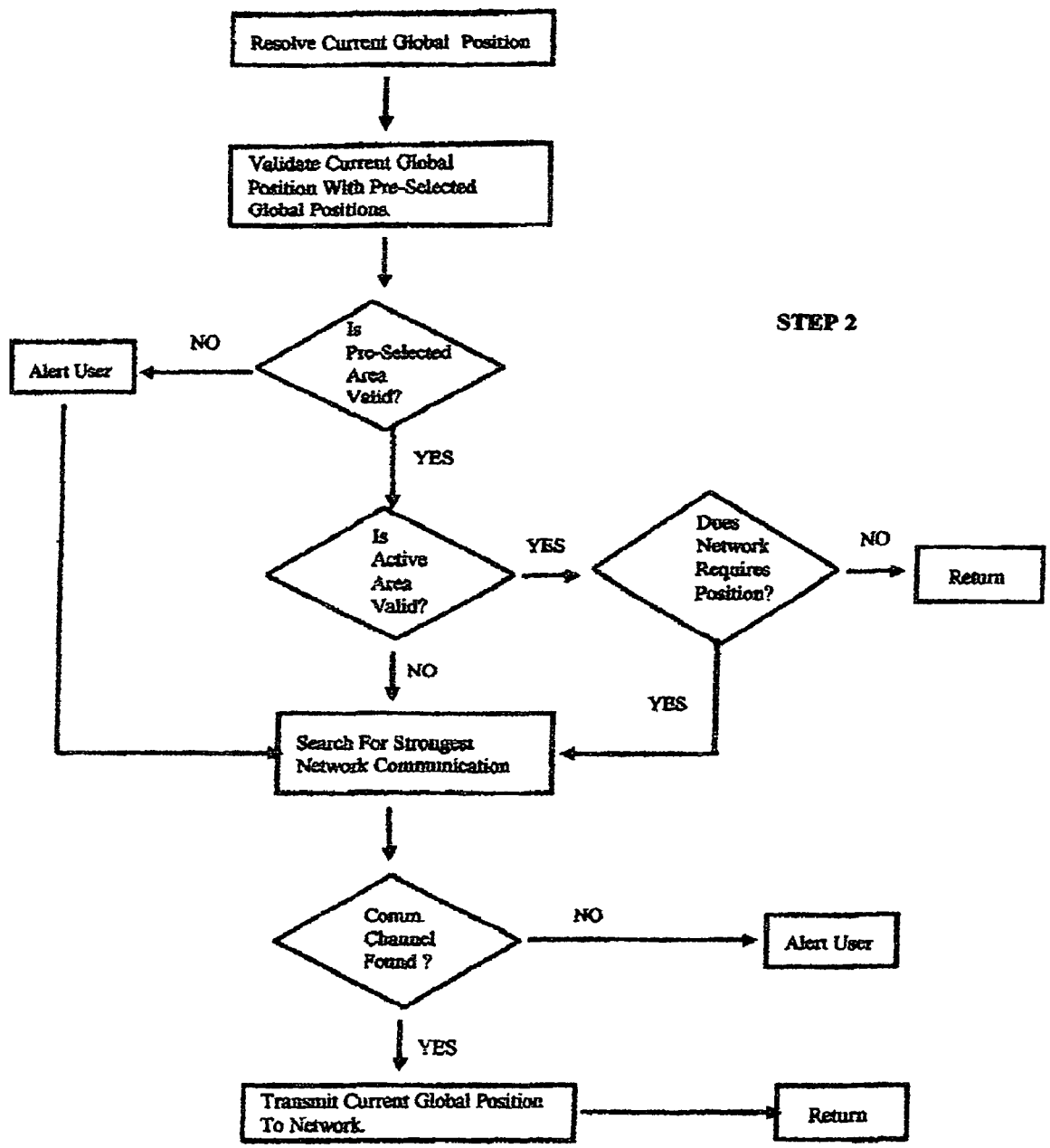
FIG. 4 is a flow chart illustrating the operation of a remote receiving unit when a global position is resolved in an attempt to determine if the remote receiving unit is out of their paging area.

A remote receiving unit will have the ability to resolve a global position from signals transmitted from satellites and earth based communication means. Periodically, the remote receiving unit will resolve a global position from these signals and compare it to reference encoded global position coordinates pre-loaded in its ROM [110]. If the CPU [108] establishes that the current global position of the remote receiving unit is not within the user's preferred location to receive pages, the user is immediately alerted that they are out of their paging area and no paging messages will be received. If the remote receiving unit current active area to receive pages is not within the previously stored active areas, the user is alerted to update the paging network with their current active area. The network may also request the remote receiving unit for its current global position. If such a message is received the subscriber in possession of the remote receiving unit is notified that an update of the network is required. The remote receiving unit will scan for the strongest network communicating channel via transceiver [101]. If such a link is established, the remote receiving unit will automatically update the network with its current global positioning coordinates. In circumstances where the remote receiving unit does not find a suitable network channel for direct communication, the remote receiving unit will alert the user that no RF communicating channel was found for automatic update of its current global position. In this situation a user could update the network by calling in and disclosing their current global coordinates resolved by the remote receiving unit. If the user is required to update the network, the remote receiving unit will periodically alert the user to update the network until an input is received from the user through input panel [109] via 220 indicating that the action has taken place. The CPU [108] will store in its memory the current resolved global position of the remote receiving unit as the current active area of the remote receiving unit held by the paging network. This will enable the CPU to determine when an active area update of the paging network is required without waiting for the network to request for such information. The actions undertaken by the remote receiving unit during this processes are best illustrated in Step 2, FIG. 4. In this illustration, the remote receiving unit first resolves a global position. Such a request might have been initiated from the user through input panel [109], the paging network or from within the remote receiving unit CPU. Upon resolving a global position, the remote receiving unit validates this position with the pre-selected areas to receive pages usually stored in the ROM. If the pre-selected areas are valid, the remote receiving unit further checks if its current active area to receive pages is valid. If the remote receiving unit current active area to receive pages is valid, the CPU checks if the paging network requires the current global coordinates of the pager. If the network does not require the remote receiving unit to update its position, the remote receiving unit resumes operation normally. If the current active area of the remote receiving unit is invalid or the pre-selected area to receive pages is invalid or the network had requested for the remote receiving unit global location, the remote receiving unit searches for the strongest network communication channel to transmit its current global position. If such a channel is found the network is automatically updated. If no such channel is found the user is alerted to update the network with the current global coordinates resolved by the remote receiving unit.

At any point in time a subscriber could use the remote receiving unit or any relevant terrestrial communication device to activate or deactivate their positioning disclosure feature from the network. In the deactivated mode the network will not disclose a subscriber's global location to a caller requesting that information. A user may override the periodic global positioning resolving feature of the remote receiving unit to obtain a current global position through the input panel [109] at any time. Once the CPU [108] resolves and makes this information available to the user, the terrestrial receiving means [104], satellite receiving means [103] and the connecting circuit [102] will be signaled to resume operation normally. With the aid of the input panel [109] and the display [114] relevant information such as current active paging area, pre-selected areas, and the remote receiving unit current global position will always be made available to a user such that an update of the paging network could be done by a user in possession of the remote receiving unit at any point in time and at any global location without a request from the network.

What is claimed is:

1. A method for updating a communication system with location information of a mobile remote unit comprising steps of:
   (a) receiving a request to provide the location information of the mobile remote unit to an authorized resource and verifying when the mobile remote unit last provided its location information to said communication system;
   (b) determining that the location information of said mobile remote unit has not been established within said communication system for a time after said verification of (a);
   (c) requesting that the location information of said mobile remote unit be established after said verification of (a) within said communication system; and
   (d) establishing the location information of the mobile remote unit;
   (e) updating said communication system with the location information of said mobile remote unit;
   wherein the determining of said step (b) further comprises:
   (i) maintaining a time stamp of when the location information of said mobile remote unit was last updated within said communication system;
   (ii) using said time stamp to verify that a predetermined time interval has passed since the location information of said mobile remote unit was last updated within said communication system and returning a result of the verification to said communication system.

2. A method according to claim 1 for updating the communication system with the location information of the mobile remote unit associated with the communication system:
   (b) periodically obtaining the location information of said mobile remote unit;
   (c) comparing said location information with known geographical areas for the mobile remote unit;
   (d) generating a sensory signal if the comparison of step (c) is negative and updating said communication system with the current location information of said mobile remote unit and;
   (e) adding one or more geographic areas corresponding to said current location information to said known geographical areas.

* * * * *